United States Patent
Cotting

(10) Patent No.: US 6,395,251 B1
(45) Date of Patent: May 28, 2002

(54) STEAM-HYDROCARBON REFORMER AND PROCESS

(76) Inventor: Steven R. Cotting, 406 Windmont Dr., NE., Atlanta, GA (US) 30329

( * ) Notice: Subject to any disclaimer, the term of this patent is extended or adjusted under 35 U.S.C. 154(b) by 110 days.

(21) Appl. No.: 09/675,804

(22) Filed: Sep. 29, 2000

Related U.S. Application Data

(60) Provisional application No. 60/160,045, filed on Oct. 18, 1999.

(51) Int. Cl.[7] ................................................. C01B 3/26
(52) U.S. Cl. ....................... 423/652; 252/373; 422/202; 422/203; 422/211
(58) Field of Search ..................... 252/373; 423/652; 422/202, 203, 211

(56) References Cited

U.S. PATENT DOCUMENTS

| | | | | |
|---|---|---|---|---|
| 4,324,649 A | * | 4/1982 | Parizot et al. | 208/130 |
| 4,935,037 A | * | 6/1990 | Koyama et al. | 48/94 |
| 4,959,079 A | * | 9/1990 | Grotz et al. | 48/198.7 |
| 5,199,961 A | * | 4/1993 | Ohsaki et al. | 48/94 |

* cited by examiner

*Primary Examiner*—Steven P. Griffin
*Assistant Examiner*—Maribel Medina Sanabria

(57) ABSTRACT

A steam-hydrocarbon reformer in which a portion of a reaction tube containing a center return tube extends within a furnace enclosure. The reaction tube receives fluid at a lower end portion disposed externally of the furnace enclosure and discharges fluid through a close coupled process fluid cooler also disposed externally of the enclosure.

19 Claims, 4 Drawing Sheets

STEAM-HYDROCARBON REFORMER AND PROCESS

This application claims the benefit of U.S. Provisional Application Ser. No. 60/160,045, filed Oct. 18, 1999.

BACKGROUND OF THE INVENTION

The present invention generally relates to an apparatus and method for carrying out catalytic reactions at elevated temperatures and more particularly to catalytic reactions in a steam-hydrocarbon reforming process.

A steam-hydrocarbon reformer is a furnace utilized to generate sufficient heat to drive an-endothermic reaction in fluid that is passed through catalyst filled reaction tubes disposed within the furnace enclosure. Fluid, in the form of a mixture of steam and hydrocarbon, flows to the reaction tubes located internally of the enclosure. Heat is produced in the enclosure by burning fuel to produce hot combustion gas. Heat is transferred to the fluid flowing through the reaction tubes indirectly via radiation and convection at a level sufficient to produce a hydrogen rich effluent gas consisting essentially of hydrogen and carbon monoxide.

The mixture of steam and hydrocarbon is introduced to the reaction tubes according to a fixed steam to hydrocarbon-carbon ratio at a temperature between about 700° F. and 1,000° F. In the reaction tubes, the mixture of steam and hydrocarbon is quickly heated to the reaction temperature and converted to a hydrogen rich effluent gas in the presence of a reforming catalyst. The effluent gas is generally withdrawn from the reaction tubes at a temperature approximately between 1,400° F. and 1,550° F.

In most prior art arrangements, multiple once-through catalyst filled reaction tubes are utilized for steam-hydrocarbon reforming. In once-through reaction tubes, the mixture of steam and hydrocarbon enters at one end of each reaction tube from a distribution header located externally of the furnace enclosure. The distribution header is connected to each reaction tube via semi-flexible conduits. The fluid flows through the reaction tubes, in contact with the reforming catalyst, and exits at the opposite ends through semi-flexible conduits connected to an outlet collection header, also located externally of the furnace enclosure.

The required reaction tube heat transfer surface area is determined from the specified average radiant heat flux. The specified average heat flux is a function of the type of burner firing arrangement employed. For example, a catalyst tube fired on only one side may utilize an average heat flux of approximately between 13,000 Btu/hr-ft$^2$ and 17,000 Btu/hr-ft$^2$ to limit the thermal stresses associated with uneven heating around the reaction tube circumference. However, a reaction tube fired on two or more sides may utilize a higher average heat flux of approximately between 23,000 Btu/hr-ft$^2$ and 35,000 Btu/hr-ft$^2$.

Once-through reaction tubes have been employed in both box and cylindrical reforming furnace enclosures generally suitable for medium to high production capacity. In box reforming furnaces, once-through reaction tubes are typically arranged vertically in either a single straight row along the center of the enclosure or in multiple straight rows evenly spaced within the enclosure. Burners used to supply flame and hot combustion gas may be arranged along the walls, floor or roof of the enclosure.

In cylindrical reforming furnaces, once through reaction tubes a re arranged vertically in either a single straight row along the center of the enclosure, in a cross pattern along the enclosure centerline, in multiple rows evenly spaced within the enclosure, or in a circular pattern along the walls of the enclosure. Either a single burner or multiple burners may be arranged i n the floor or roof of the enclosure.

One common problem with prior art steam-hydrocarbon reformers is that a high uniform heat flux is required to quickly raise the fluid temperature to its reaction temperature and maintain it at approximately between 1,400° F. and 1,550° F. As a result, an uneven tube wall temperature profile develops along the length of each reaction tube due to the flow patterns of the combustion gas inside the furnace enclosure and the process fluid inside the reaction tubes. At the reaction tube outlets, where the process fluid has little remaining capacity to absorb heat, excessively high tube wall temperatures cause carbon deposits to form on the surfaces of the catalyst and on the inside surfaces of the reaction tubes. This results in reduced catalyst activity and damage to the reaction tubes.

U.S. Pat. No. 4,324,649 discloses a steam-hydrocarbon reformer that controls reaction tube wall temperature profiles by allowing the combustion gas to flow in a back mixed flow pat tern in the bottom portion of the furnace enclosure and a plug flow pattern in the top portion of the enclosure. This two-zone approach is limited to use in natural draft furnaces where pressure drop caused by channeling the flow of combustion gas results in turbulent upstream flow patterns. Unfortunately, in natural draft furnace arrangements, convection heat exchange equipment must be mounted above the furnace combustion gas outlet to recover the waste heat in the combustion gas exiting the furnace enclosure. This requires the construction of a large structure to support the furnace enclosure, the convection heat exchange equipment and the combustion gas stack.

Another problem with prior art arrangements is that average radiant heat flux, not reaction kinetics, is the controlling factor in determining the number and size of the reaction tubes. Achieving the required reaction tube heat transfer surface area for the specified average heat flux results in an excessive volume of catalyst required to affect the reaction, lower process fluid velocities inside the reaction tubes, and increased process fluid residence time inside the catalyst bed. These conditions contribute to inefficient heat transfer within the reaction tube and uneven heating of the reaction tube walls.

Yet another problem with prior art arrangements is the requirement for high alloy semi-flexible connecting conduits at the reaction tube outlets. Stresses caused by thermal expansion must be relieved by providing pigtail, trombone loop or omega loop connections between the reaction tube outlets and the collection header. Additional piping flexibility must be provided between the collection header and the downstream process equipment.

The most serious problem with the prior art steam-hydrocarbon reformers is that the cost of unutilized catalyst and extra reaction tubes, the cost of a complex high alloy reaction tube outlet piping system, and the cost of building vertically to obtain the benefits of natural draft cannot presently be justified for low production capacity steam-hydrocarbon reformers. Thus, a need still exists for a cost effective steam-hydrocarbon reformer suitable for use in the low production capacity environment such as where the maximum desired production capacity of hydrogen rich effluent gas is approximately 24,000 standard cubic feet per hour on a dry gas basis.

BRIEF SUMMARY OF THE INVENTION

The steam-hydrocarbon reformer of the present invention includes: (a) a furnace enclosure with at least one burner located inside the enclosure; (b) a vertical reaction tube located internally of the enclosure with a center return tube nested within the reaction tube and a reforming catalyst packed between the reaction tube and the center return tube; and (c) a process fluid cooler located externally of the enclosure with the center return tube outlet directly connected to the process fluid cooler inlet.

In another aspect of the invention, the above described steam-hydrocarbon reformer is used in a process for producing a hydrogen rich effluent gas by: (a) heating the furnace enclosure by burning a flammable gas or liquid inside the enclosure with the burner(s) so as to produce a combustion gas; (b) flowing the combustion gas through the furnace enclosure under an induced draft; (c) introducing a mixture of steam and hydrocarbon into the reaction tube; (d) converting at least a portion of the steam and hydrocarbon mixture to a hydrogen rich effluent gas; (e) flowing the hydrogen rich effluent gas through the center return tube; and (f) cooling the hydrogen rich effluent gas in the process fluid cooler. In a preferred embodiment, the above described steam-hydrocarbon reformer produces a maximum of approximately 24,000 standard cubic feet per hour of hydrogen rich effluent gas on a dry gas basis.

Advantages of the invention will be obvious from the description, or may be learned by practice of the invention. Additional advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWING

The various features and advantages of the present invention will be more fully appreciated by reference to the following detailed description when taken in conjunction with the accompanying drawings wherein.

DETAILED DESCRIPTION OF THE INVENTION

Before the present devices are disclosed and described, it is to be understood that the terminology used herein is for the purpose of describing particular embodiments only and is not intended to be limiting.

Figure 1:
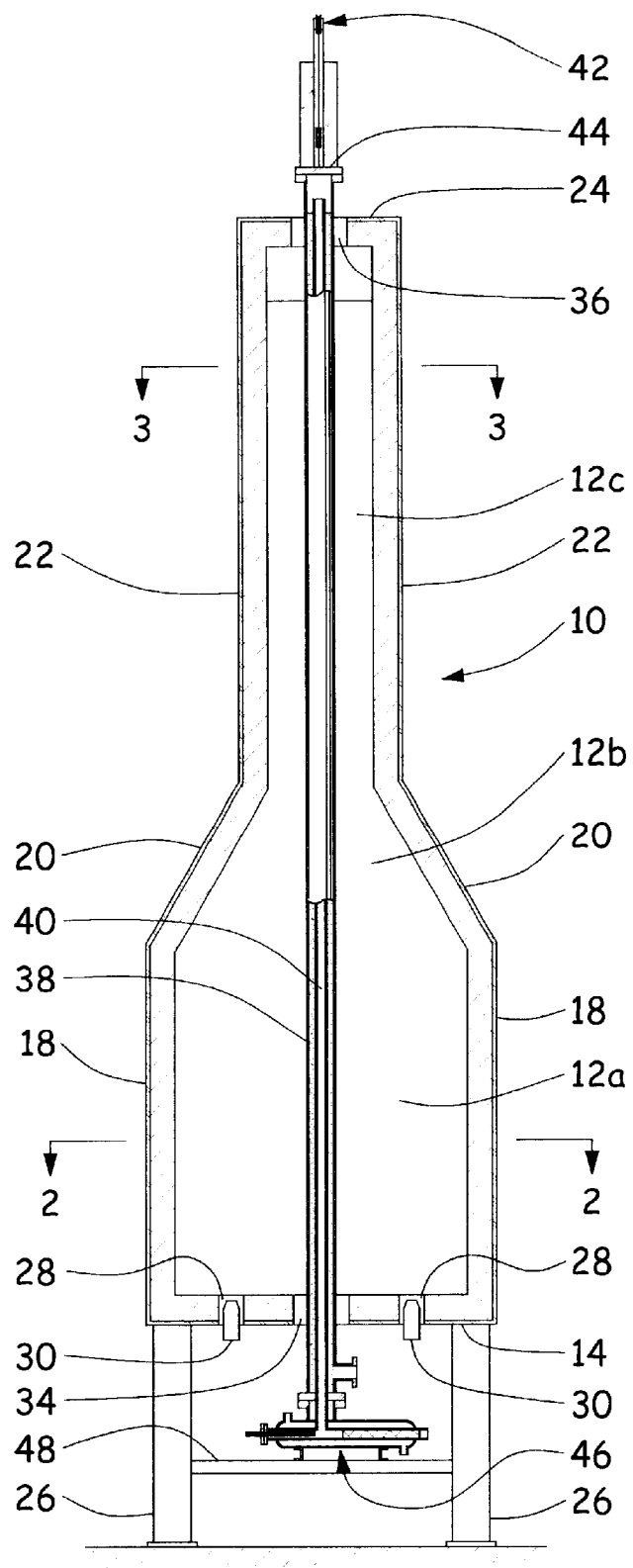
FIG. 1 is a cross-sectional elevation view depicting a preferred embodiment of the steam-hydrocarbon reformer of the present invention.
Figure 1A:
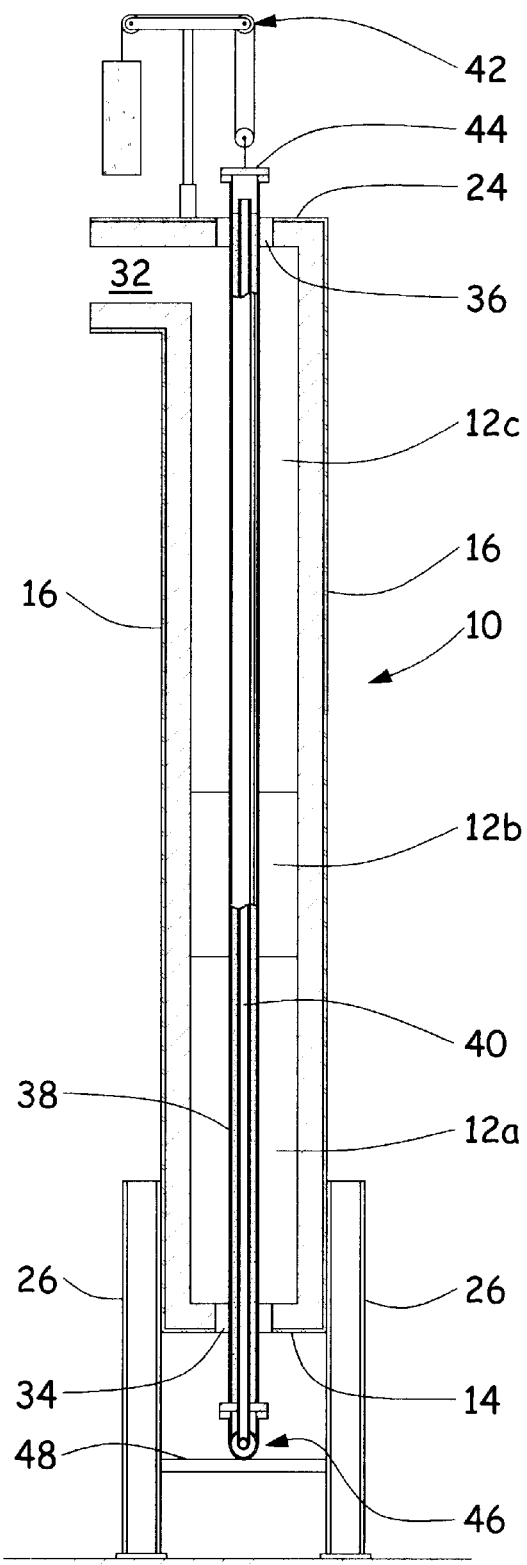
FIG. 1A is a cross-sectional elevation side view of the steam-hydrocarbon reformer of FIG. 1.

Referring to the embodiment of FIG. 1, the steam-hydrocarbon reformer 10 includes a three section radiant chamber comprised of a lower heating zone 12a, a transitional heating zone 12b and an upper heating zone 12c. The radiant chamber enclosure is formed by a horizontal floor 14, opposed vertical end walls 16 (see FIG. 1A) adjoining the floor 14, opposed vertical lower side walls 18 adjoining the floor 14 and the end walls 16, opposed transitional side walls 20 adjoining the end walls 16 and lower side walls 18 and sloping inward no less than 60° from horizontal, opposed vertical upper side walls 22 adjoining the end walls 16 and the transitional side walls 20, and a horizontal roof 24 adjoining the end walls 16 and the upper side walls 22. The walls of the enclosure are formed of carbon steel plate internally insulated with a ceramic fiber blanket. Vertical beams 26 function to support the enclosure.

Ports 28 are provided in the floor 14 of the furnace enclosure, through which burners 30 are inserted to provide flame and hot combustion gas within the radiant chamber. The combustion gas passes upwardly through the radiant chamber and discharges through the combustion gas outlet 32 (see FIG. 1A) under an induced draft.

An opening 34 is formed in the floor 14 of the furnace enclosure and extends along the vertical centerline of the radiant chamber. An opening 36 is formed in the roof 24 of the enclosure directly above the floor opening 34. A reaction tube 38 with a center return tube 40 extends through the enclosure and is vertically oriented. The reaction tube 38 extends through the openings 34 and 36 with its lower end portion extending below the floor 14 of the enclosure. The upper end of the reaction tube 38 extends above the roof 24 of the enclosure and is secured to a weight and pulley system, shown in general by the reference numeral 42 (see FIG. 1A). The upward movement permitted by the weight and pulley system 42 compensates for the thermal expansion of the reaction tube 38 along its longitudinal axis.

The fluid introduced to the reaction tube 38. is a mixture of steam and hydrocarbon. A solid catalytic material is packed between the reaction tube 38 and the center return tube 40 so that a reaction takes place in the reaction tube 38 when the burners 30 raise the temperature within the radiant chamber to a predetermined level, all in a conventional manner. A cap 44 is provided at the upper end of the reaction tube 38 to permit insertion of the catalyst into the reaction tube 38. Although not shown in the drawing, it is understood that a plate with a plurality of perforations is provided in the upper end portion of the reaction tube 38 to permit the fluid within the reaction tube 38 to flow outwardly into the center return tube 40 while still retaining the catalyst with the reaction tube 38.

The mixture of steam and hydrocarbon enters the reaction tube 38 at the lower end portion. The upper end portion of the reaction tube 38 is in fluid communication with the upper end portion of the center return tube 40 so that process fluid passes upwardly through the catalyst bed in single pass, co-current heat exchange relationship with combustion gas in the radiant chamber and then downwardly within the center return tube 40 in single pass, countercurrent heat exchange relationship with process fluid in the reaction tube 38.

The lower end portion of the center return tube 40 is attached to a direct contact cooler 46 located externally of the furnace enclosure. The weight of the reaction tube 38 and the center return tube 40 is supported by the direct contact cooler 46 which is supported by horizontal beams 48 attached to the vertical beams 26.

The reaction tube wall temperature profile is controlled by the geometry of the furnace enclosure. By utilizing three heating zones, the combustion gas flow pattern, the combustion gas velocity and the fraction of radiation from the burner flames intercepted directly by the reaction tube are manipulated throughout the radiant chamber to control the radiant heat flux in each zone. This, in turn, produces a uniform reaction tube wall temperature profile along the length of the reaction tube. The heat flux is deliberately maximized at the lower end portion of the reaction tube 38 to quickly heat the mixture of steam and hydrocarbon to its reaction temperature. Conversely, the heat flux is minimized at the upper end portion of the reaction tube 38 to prevent carbon deposits from forming on the surface of the catalyst and on the inside surface of the reaction tube 38 wall.

Figure 2:
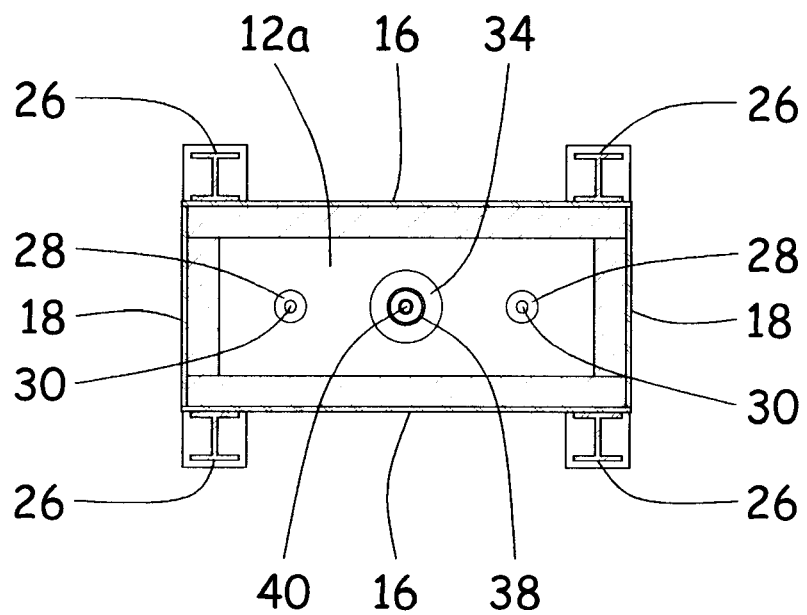
FIG. 2 is a cross-sectional view taken along the line 2—2 of FIG. 1.

The benefits of the furnace enclosure geometry can be best illustrated by referring to FIG. 2. The preferred furnace enclosure has a rectangular horizontal cross-sectional area at the lower heating zone 12a extending to a particular height above the floor 14. The length and width of the cross-sectional area are chosen to limit the combustion gas velocity below 5 feet per second and to accommodate the burners 30 without allowing flame to impinge on the reaction tube 38 or the furnace enclosure walls. The height of the lower heating zone 12a is selected to achieve complete combustion of the fuel and to reach a process fluid temperature inside the reaction tube 38 of approximately between 1,350° F. and 1,400° F. at the exit of the zone. The minimum allowable height of the lower heating zone 12a extends just beyond the length of the flame to prevent flame impingement on the transitional side walls 20. The average radiant heat flux in the lower heating zone 12a is approximately between 30,000 Btu/hr-ft$^2$ and 35,000 Btu/hr-ft$^2$ with radiative heat transfer accounting for approximately 95% of the total heat transferred within the zone.

Figure 3:
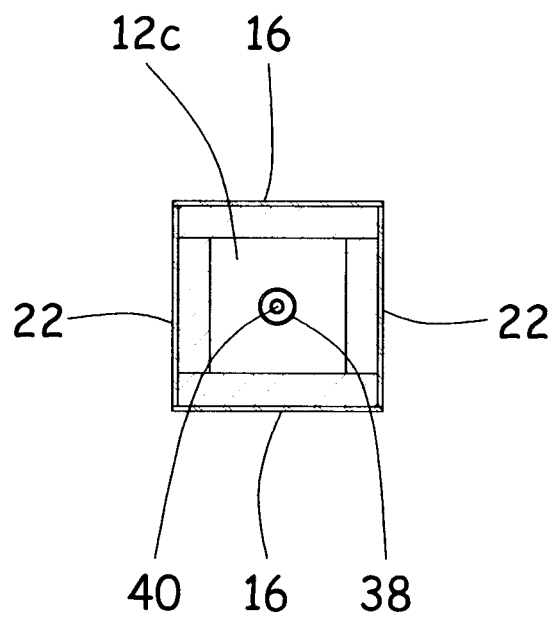
FIG. 3 is a cross-sectional view taken along the line 3—3 of FIG. 1.

Referring to FIG. 3, it can be seen that the furnace enclosure at the upper heating zone 12c has a square horizontal cross-sectional area extending a length above the transitional heating zone 12b. The size of the cross-sectional area is chosen to increase the combustion gas velocity in the upper heating zone 12c to approximately between 10 feet per second and 20 feet per second. The square cross-sectional area also serves to conceal the upper end portion of the reaction tube from the burner flames, thus reducing the fraction of radiation from the burner flames intercepted directly by the reaction tube. The height of the upper heating zone 12c is set as-required to accommodate the remaining length of the reaction tube 38. As the combustion gas flows upwardly through the upper heating zone 12c, the radiant heat flux diminishes along with the temperature of the combustion gas and the fraction of radiation from the burner flames intercepted directly by the reaction tube. At this point, convective heat transfer becomes more prevalent. Convective heat transfer is improved in the upper heating zone 12c by increasing the velocity of the combustion gas to reduce the thickness of the boundary layer which clings to the surface of the reaction tube. The average radiant heat flux in the upper heating zone 12c is approximately between 12,000 Btu/hr-ft$^2$ and 20,000 Btu/hr-ft$^2$ with radiative heat transfer accounting for only approximately 70% of the total heat transferred within the zone.

While the horizontal cross-sectional areas of the furnace enclosure lower heating zone 12a and upper heating zone 12c of the preferred embodiment are generally rectangular in shape, circular shapes are also suitable.

Figure 4:
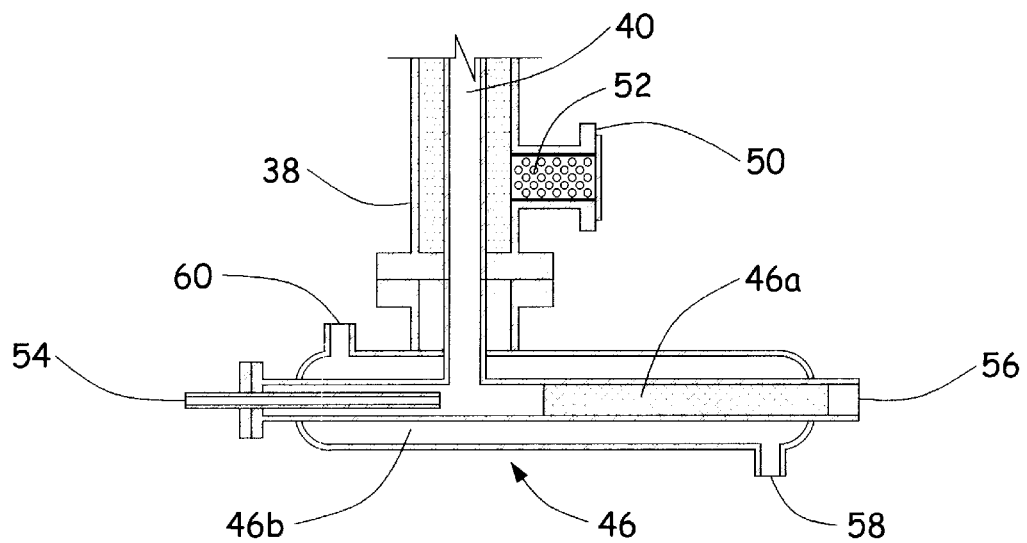
FIG. 4 is an enlarged cross-sectional elevation view of the process fluid cooler utilized in the steam-hydrocarbon reformer of FIG. 1.

Referring to FIG. 4, it can be seen more clearly that in the preferred embodiment of the present invention, the mixture of steam and hydrocarbon flows into the lower end of the reaction tube 38 through a nozzle 50 and hydrogen rich effluent gas flows outwardly from the center return tube 40 into the direct contact cooler 46. The reaction tube inlet nozzle 50 is provided with an insert 52 with a plurality of perforations that functions to permit removal of the catalyst and to retain the catalyst within the tube during operation while still permitting the mixture of steam and hydrocarbon to flow into the bottom of the reaction tube 38.

The direct contact cooler consists of a fluid mixing section 46a and a water cooled jacket 46b. In the mixing section 46a, water, sprayed through a nozzle 54, mixes with hydrogen rich effluent gas from the center return tube 40. The cooled effluent gas flows outwardly from the mixing section 46a through a nozzle 56. Varying the amount of water sprayed into the mixing section 46a controls the temperature of the cooled effluent gas. To control the tube wall temperature of the mixing section 46a, water flows continuously through the direct contact cooler water jacket 46b via inlet 58 and outlet 60 nozzles located at the bottom and the top of the water jacket 46b, respectively.

Figure 5:
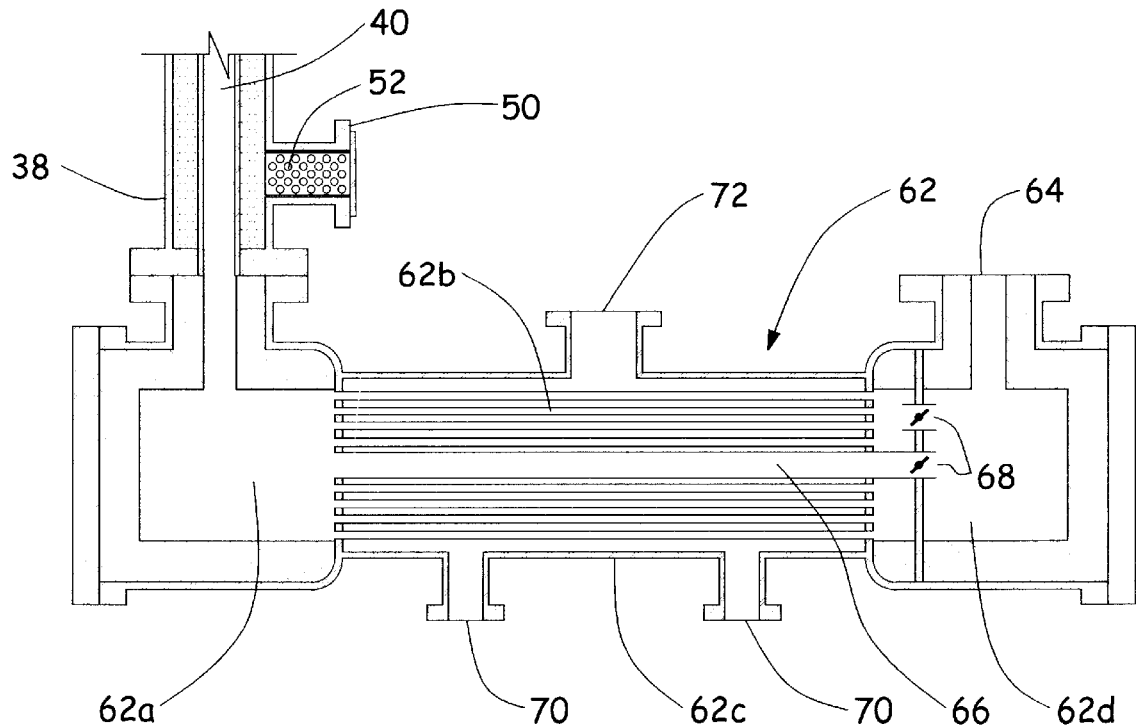
FIG. 5 is an enlarged cross-sectional elevation view of an alternate embodiment of a process fluid cooler utilized in the steam-hydrocarbon reformer of FIG. 1.

Referring to FIG. 5, an alternate embodiment of the present invention is depicted. This view is similar to that of FIG. 4 and identical components will be given the same reference numeral. In this embodiment, the lower end portion of the center return tube 40 attaches to an indirect contact cooler 62 located externally of the furnace enclosure consisting of an inlet plenum 62a, a tube bundle 62b contained within a shell 62c, and an outlet plenum 62d. The weight of the reaction tube 38 and the center return tube 40 is supported by the indirect contact cooler 62 which is supported by horizontal beams 48 attached to the vertical beams 26.

The mixture of steam and hydrocarbon flows into the lower end of the reaction tube 38 through a nozzle 50 and hydrogen rich effluent gas flows outwardly from the center return tube 40 into the indirect contact cooler inlet plenum 62a. The effluent gas flows from the inlet plenum 62a to the outlet plenum 62d through a bundle of tubes 62b where the gas is cooled by indirect heat exchange with water. The inlet and outlet plenums are internally insulated to allow carbon steel construction. The cooled effluent gas flows outwardly from the outlet plenum 62d through a nozzle 64. Allowing a portion of the hot gas to bypass the tube bundle via the center bypass tube 66 controls the temperature of the cooled effluent gas. Adjusting the bypass valves 68 regulates the amount of gas bypassed. Water enters the indirect contact cooler shell 62c through two nozzles 70 at the bottom of the shell 62c. Partially vaporized water leaves the indirect contact cooler 62 through a nozzle 72 at the top of the shell.

It is thus seen that, by virtue of the single reaction tube 38 extending within a furnace enclosure containing a center return tube 40 close coupled to a process fluid cooler 46 or 62, the mixture of steam and hydrocarbon, while flowing through the system, is heated to the reaction temperature, reacted to form a hydrogen rich effluent gas and cooled. The present invention provides a uniform reaction tube wall profile under induced draft conditions in a compact furnace enclosure requiring no inlet and outlet headers, connecting conduits and riser or downcomer piping. This, of course, considerably reduces the complexity of the design making the system cost effective to manufacture.

It will be understood by those skilled in the art that while the present invention has been disclosed with reference to preferred embodiments, various modifications, changes and substitutions can be made thereto without departing from the spirit and scope of the present invention as set forth in the following claims. Accordingly, it is appropriate that the appended claims be construed broadly and in a manner consistent with the spirit and scope of the invention therein.

What is claimed is:

1. A steam-hydrocarbon reformer comprising:
   a) a furnace enclosure comprised of a roof, a floor, walls, and at least one burner located therein;
   b) a reaction tube wherein the reaction tube:
      i) extends vertically inside the furnace enclosure,
      ii) terminates above the roof of the furnace enclosure and below the floor of the furnace enclosure,
      iii) contains a center return tube nested within the reaction tube, and
      iv) contains a reforming catalyst packed between the reaction tube and the center return tube; and
   c) a process fluid cooler, wherein the process fluid cooler is located externally of the furnace enclosure, said cooler having an inlet connected directly to the center return tube outlet.

2. The steam-hydrocarbon reformer of claim 1, wherein the process fluid cooler comprises a direct contact cooler.

3. The steam-hydrocarbon reformer of claim 2, wherein the direct contact cooler comprises a fluid mixing section and a water cooled jacket.

4. The steam-hydrocarbon reformer of claim 1, wherein the process fluid cooler comprises an indirect contact cooler.

5. The steam-hydrocarbon reformer of claim 4, wherein the indirect contact cooler comprises an inlet plenum, a tube bundle contained within a shell, and an outlet plenum.

6. The steam-hydrocarbon reformer of claim 1, wherein the furnace enclosure is further comprised of:
   a) a lower heating zone at the bottom of the furnace enclosure having a horizontal cross-sectional area, wherein the cross-sectional area extends to a particular height above the floor of the furnace enclosure;
   b) a transitional heating zone extending up from the top of the lower heating zone and formed by transitional side walls sloping inward towards the reaction tube at least about 60° from horizontal; and
   c) an upper heating zone at the top of the furnace enclosure having a horizontal cross-sectional area, wherein the cross-sectional area extends for a height above the transitional heating zone of the furnace enclosure.

7. The steam-hydrocarbon reformer of claim 6, wherein the lower and upper heating zone horizontal cross-sectional areas are generally rectangular in shape.

8. The steam-hydrocarbon reformer of claim 6, wherein the lower and upper heating zone horizontal cross-sectional areas are generally circular in shape.

9. The steam-hydrocarbon reformer of claim 6, wherein the lower heating zone horizontal cross-sectional area is selected such that the combustion gas velocity is less than approximately 5 feet per second.

10. The steam-hydrocarbon reformer of claim 6, wherein the upper heating zone horizontal cross-sectional area is selected such that the combustion gas velocity is approximately between 10 feet per second and 20 feet per second.

11. The steam-hydrocarbon reformer of claim 6, wherein the height of the lower heating zone is selected such that combustion of the fuel is essentially completed within the lower heating zone and the process fluid temperature inside the reaction tube reaches approximately between 1,350° F. and 1,400° F. at the exit of the lower heating zone.

12. The steam-hydrocarbon reformer of claim 1, wherein the weight of the reaction tube is supported at its bottom by the process fluid cooler.

13. The steam-hydrocarbon reformer of claim 12, further including a weight and pulley system secured to the top of the reaction tube providing tension to assist with the upward thermal expansion of the reaction tube.

14. A process for producing hydrogen rich effluent gas comprising:
   a) providing a steam-hydrocarbon reformer, wherein the steam-hydrocarbon reformer comprises:
      i) a furnace enclosure comprised of a roof, a floor, walls, and at least one burner located therein;
      ii) a reaction tube wherein the reaction tube:
         (1) extends vertically inside the furnace enclosure,
         (2) terminates above the roof of the furnace enclosure and below the floor of the furnace enclosure,
         (3) contains a center return tube nested within the reaction tube, and
         (4) contains a reforming catalyst packed between the reaction tube and the center return tube; and
      iii) a process fluid cooler, wherein the process fluid cooler is located externally of the furnace enclosure, said cooler having an inlet connected directly to the center return tube outlet;
   b) heating the furnace enclosure by burning a flammable gas or liquid inside the enclosure with the burner(s) so as to produce a combustion gas;
   c) flowing the combustion gas through the furnace enclosure under an induced draft;
   d) introducing a mixture of steam and hydrocarbon into the reaction tube;
   e) converting at least a portion of the steam and hydrocarbon mixture to a hydrogen rich effluent gas;
   f) flowing the hydrogen rich effluent gas through the center return tube; and
   g) cooling the hydrogen rich effluent gas in the process fluid cooler.

15. The process of claim 14, wherein the process fluid cooler directly injects water into the hydrogen rich effluent gas.

16. The process of claim 14, wherein the process fluid cooler directly cools the hydrogen rich effluent gas by heat exchange.

17. The process of claim 14, wherein the furnace enclosure is further comprised of a lower heating zone at the bottom of the furnace enclosure where combustion gas velocity is less than approximately 5 feet per second.

18. The process of claim 14, wherein the furnace enclosure is further comprised of an upper heating zone at the top of the furnace enclosure where the combustion gas velocity is approximately between 10 feet per second and 20 feet per second.

19. The process of claim 14, wherein the furnace is further comprised of a lower heating zone at the bottom of the furnace enclosure where combustion of the fuel is essentially completed within the lower heating zone and the process fluid temperature inside the reaction tube reaches approximately between 1,350° F. and 1,400° F. at the exit of the lower heating zone.

* * * * *